March 19, 1968   L. M. CHRISTIANSON   3,373,545
DUST COLLECTING SYSTEM

Filed April 11, 1966   3 Sheets-Sheet 1

Inventor
Lynn M. Christianson
By Darbo, Robertson &
Vandenburgh
Att'ys.

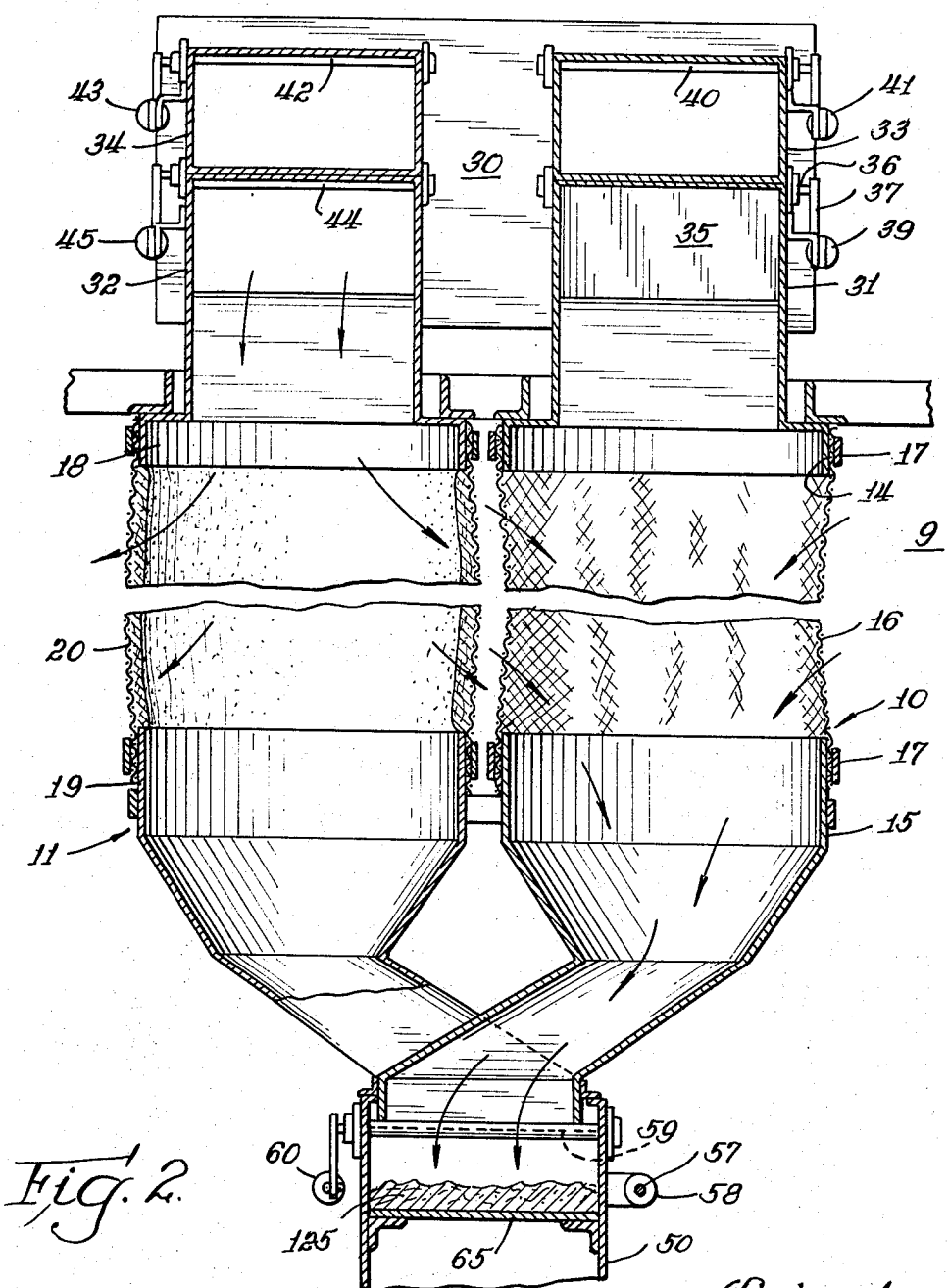

March 19, 1968  L. M. CHRISTIANSON  3,373,545
DUST COLLECTING SYSTEM
Filed April 11, 1966  3 Sheets-Sheet 3
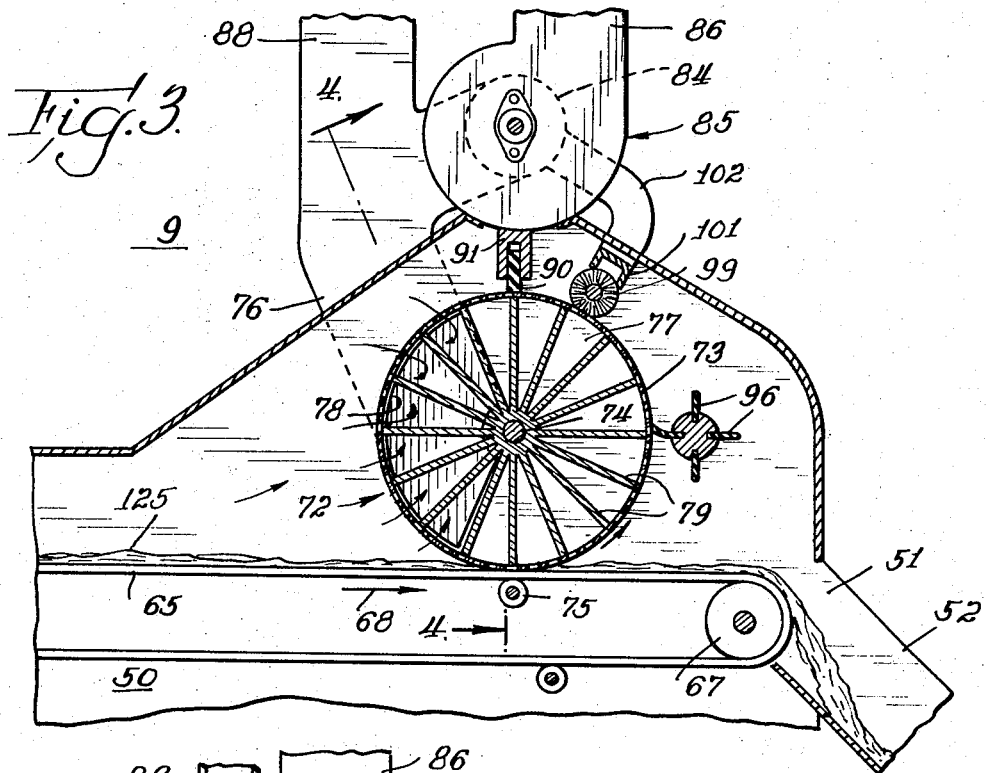
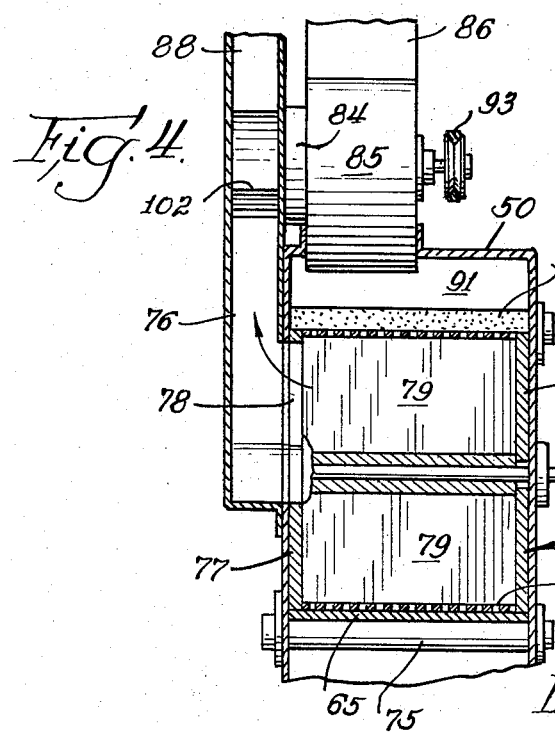
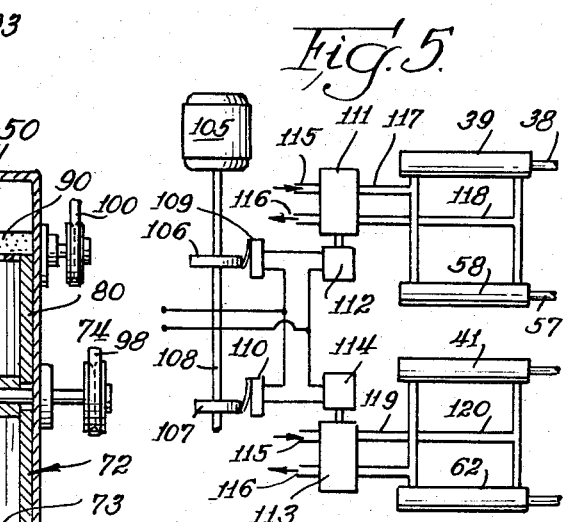
Inventor
Lynn M. Christianson
By Darbo, Robertson & Vandenburgh
Att'ys.

United States Patent Office 3,373,545
Patented Mar. 19, 1968

3,373,545
DUST COLLECTING SYSTEM
Lynn M. Christianson, 7 Elaine Circle E.,
Prospect Heights, Ill. 60070
Filed Apr. 11, 1966, Ser. No. 541,681
12 Claims. (Cl. 55—273)

ABSTRACT OF THE DISCLOSURE

A dust-collecting apparatus is provided which comprises a plurality of individual separators. Each separator includes spaced upper and lower plenums connected by a fabric tube. The upper plenums all communicate to individual valves to the discharge end of a pickup blower. The exterior of the tubes are exposed to the interior of the building within which the dust pickup takes place. The bottom plenums are in the form of chutes and each has an individual valve. An enclosure about the bottom of all of the chutes houses a dust conveyor. In this housing is a secondary dust separator. Normally the air carrying the dust is introduced through the open valves into the top intake plenum. The dust is trapped in the tubes while the air passes through the fabric and is thereby returned to the building. One at a time, the separators are taken off stream by closing the intake valve. A discharge valve is opened between the discharge plenum and the housing air is withdrawn from the housing through the secondary separator, which is a drum type separator. Both by gravity and by this air flow the dirt and dust from the interior of the separator that is off stream is carried into the housing where it is transferred to an outlet by the conveyor. The air flow passes through the secondary separator and then is returned to the initial dust pickup conduit so that it flows back through the separators which remain on stream.

---

The present invention relates to a method and apparatus of dust collection, such as might be used in a textile mill or other industrial plant, and the following disclosure thereof is offered for public dissemination upon the grant of a patent therefor.

The usual dust-collecting system ultimately exhausts the air into the atmosphere after first extracting the majority of the dust from that air. This has two disadvantages that are overcome by the present invention. The most important of these is the matter of heat (or cooling) loss in the air from which the dust is being extracted. To the extent that air is removed from the building and discharged outside, that air must be replaced by air from outside the building. The replacement air must be conditioned, i.e. heated or cooled, to correspond to the conditions being maintained in the building. The cost of so conditioning the air can be substantial when the temperature varies widely from the desideratum of the interior of the building. No less important is the fact that to the extent that the discharged air contains dust, no matter how small, it constitutes an air pollution factor.

A further important facet of the present invention is that embodiments may be as large or as small as conditions require and yet will operate with the required efficiency without occupying an undue amount of floor space. Thus, instead of having a central dust collector with ducts running from all over the plant to the single dust collector, it may be desirable to install an individual dust collector with each machine or an individual battery of machines. The ability to do this is facilitated by the fact that air discharge outside of the building is not required. Such a procedure would be particularly advantageous in a textile mill, for example, because it would be a basis for eliminating the mixing of various textile fibers. The salvage value of the unmixed fibers is greatly in excess of the salvage value of mixed fibers.

Further objects and advantages of the invention will be apparent from the following description taken in conjunction with the drawings, in which:

FIGURE 2 is a section as viewed at line 2—2 of FIGURE 1;

FIGURE 3 is an enlarged section of the secondary separator as viewed in FIGURE 1;

FIGURE 4 is a section as viewed at line 4—4 of FIGURE 3; and

FIGURE 5 is a schematic of a part of a control system.

Figure 1:
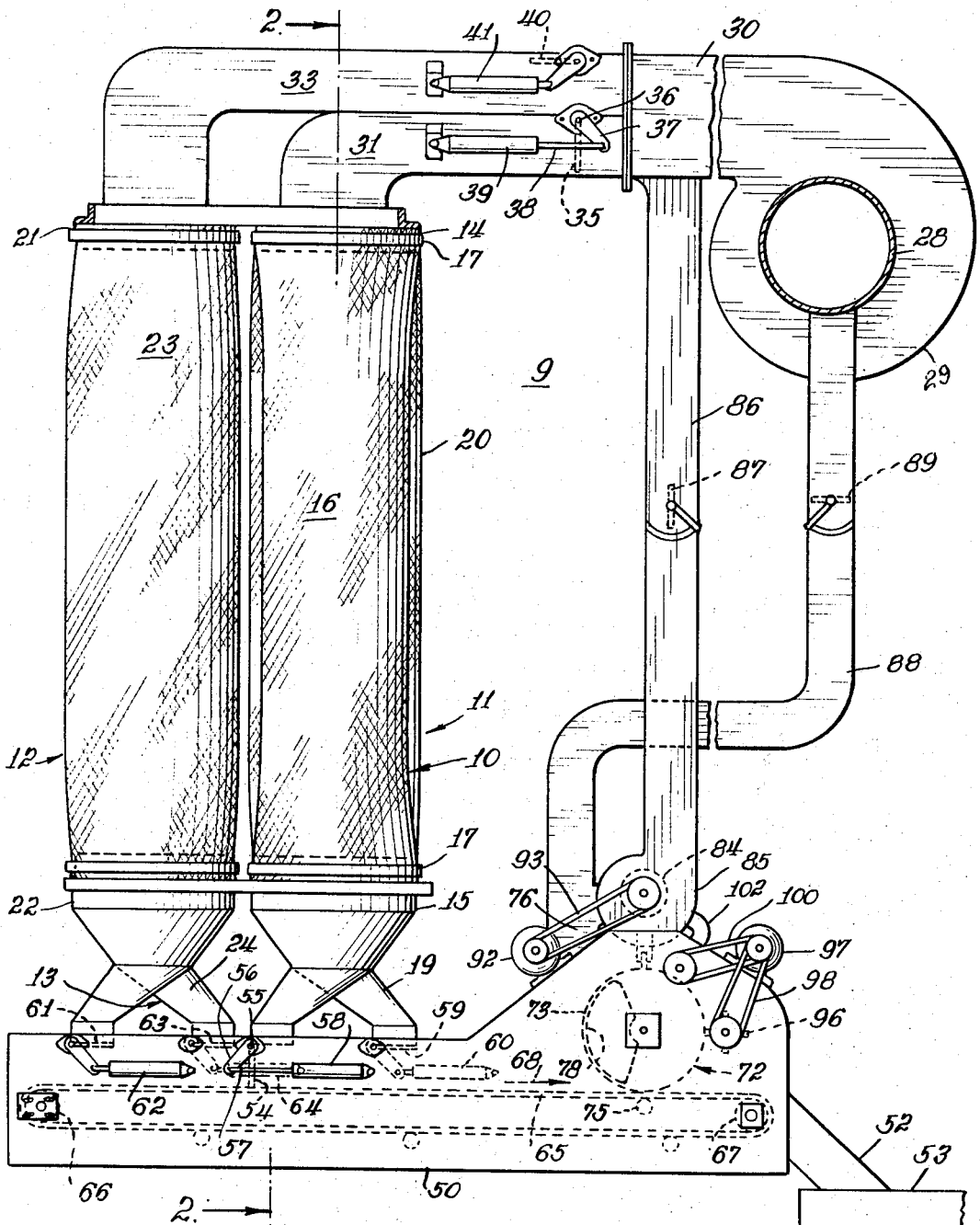
FIGURE 1 is an elevational view of an embodiment of the invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

In the illustrated embodiment there are four primary separators, generally 10, 11, 12 and 13 located in the building 9 in which the air cleaning operation is performed. Separator 10 has a rigid top or intake plenum 14 and a rigid bottom or discharge plenum 15 including a funnel-shaped chute. Intermediate the top and bottom is a cloth bag 16 held in place by clamping bands 17. Similarly separator 11 has a top 18 forming an intake plenum, a bottom 19 forming a discharge plenum, and a connecting bag 20. Separator 12 has a top 21, a bottom 22, and a bag 23. Only the bottom 24 of separator 13 is visible in the drawings, but otherwise separator 13 is the same as the others.

The four bags 16, 20, etc., are formed of a suitable material which will be permeable to the air flow, but which will be impermeable to the flow of dust therethrough. The exact form of this material will depend to a major extent upon the composition of the particular dust being collected, bag service requirements, etc. A canvas or other woven material would be suitable for most installations. In the illustrated embodiment the "bags" are nothing more than tubes in that they do not have a bottom (apart from the discharge plenum).

The dust to be collected is picked up by an air stream and delivered to the separating apparatus through a conduit 28. Incidentally, the word "dust" as employed herein, is used to encompass any nonliquid or nongaseous materials that may be air-borne. It would include such items as textile fibers, hair, dirt, sawdust, feathers, etc. Conduit 28 connects with the intake of a main blower 29. The discharge of main blower 29 is into a conduit 30. Conduit 30 divides into four ducts 31, 32, 33 and 34, leading to separators 10, 11, 12 and 13, respectively.

Gate valves are located in each of ducts 31–34, so that the flow of air to each of the separators can be individually controlled. Thus, duct 31 has a gate 35 secured to pivotally mounted shaft 36. An arm 37 is also connected to shaft 36 and to the piston rod 38 of an air cylinder 39. In the illustrated embodiment gate 35 is closed, shutting off the flow of air through duct 31 to bag 16 from blower 29. Similarly, in duct 33 there is a gate valve 40 controlled by an air cylinder 41. Duct 34 has a gate valve 42 controlled by an air cylinder 43, and duct 32 has a gate valve 44 controlled by an air cylinder 45. By actuation of the air cylinders the respective valves may be opened or closed.

The bottom end of the chutes 15, 19, 22 and 24 extend into a closed housing 50, having a discharge opening 51 communicating with a discharge chute 52. Chute 52 empties into a closed container 53. At the bottom of chute 15 is a gate valve 54 secured to pivotally mounted shaft 55. An arm 56 is secured to shaft 55 and also to piston rod 57 of air cylinder 58. By actuating air cylinder 58 gate valve 54 may be moved from the position illustrated in FIGURE 1 at which it closes the space in housing 50 above the conveyor belt to a poistion at which it closes the bottom opening of chute 15. Similarly, chute 19 has its bottom closed by a gate valve 59 which is pivotally mounted and operated by an air cylinder 60. Chute 22 has a pivotally mounted gate valve 61 operated by an air cylinder 62. Chute 24 has a gate valve 63 operated by an air cylinder 64.

A conveyor belt 65 is trained for movement about two end pulleys 66 and 67. One of these pulleys includes a pulley-head motor (not shown) for driving the upper run of the conveyor belt 65 in the direction indicated by arrow 68.

Also within housing 50 is a secondary separator generally 72. This comprises a perforate drum 73 rotatably mounted by a shaft 74. Drum 73 bears against belt 65. This contact pressure is maintained by an idler pulley 75 below the belt. The movement of belt 65 drives drum 73 in a counterclockwise direction as viewed in the drawings.

A duct 76 communicates with one end of the interior of the drum through a valve means. This valve means comprises an end plate 77 having a segmental opening 78 therein and a plurality of vanes 79 forming spokes of drum 73. Vanes 79 extend the full distance between side plate 77 and an opposite side plate 80.

Duct 76 communicates with the intake 84 of a blower 85. Blower 85 discharges into conduit 30 by way of conduit 86. A damper valve 87 is received in conduit 86. Also conduit 76 communicates with a conduit 88 leading to intake conduit 28. A damper valve 89 is included in conduit 88.

The two ends of drum 73 bear against plates 77 and 80 to prevent any air passing between the ends of the drum and the sides of housing 50. The contact between drum 73 and belt 65 prevents any air from passing about the bottom of the drum. A gate 90 rides on the top of drum 73 to prevent any air from passing over the top of the drum. Gate 90 is formed of felt, rubber, or the like. It is held in a holder 91 and is urged downwardly by gravity, although this force may be supplemented by springs, if desired. Blower 85 is driven by a motor 92 through a belt 93.

A rotary beater, including flexible arms 96 is mounted so that the arms will brush the periphery of drum 73 to dislodge dust and the like therefrom. The beater is driven by a motor 97 through a belt 98 and rotates in a counterclockwise direction. The periphery of the drum also is cleaned by a brush 99 also rotated by motor 97 through a belt 100. The upper side of brush 99 is exposed to a vacuum manifold 101 which communicates with intake 84 through a duct 102.

FIGURE 5 illustrates a portion of one form of apparatus that may be employed to control the dust collector. It includes a timer actuated by an electric motor 105 which drives a series of cams 106, 107, etc., through a shaft 108. The cams actuate switches 109, 110, etc., respectively. Switch 109 controls the actuation of a four-way valve 111 through a solenoid 112. Similarly, switch 110 controls the actuation of a four-way valve 113 through a solenoid 114.

There is an air supply line 115 leading to both valves 111 and 113, and an air exhaust line 116 discharging from each of these valves. An air line 117 leads from valve 111 to the rear end of both of cylinders 39 and 58, while a line 118 leads from the valve to the forward end of each of the cylinders. Similarly, a line 119 leads from valve 113 to the rear end of both cylinders 41 and 62, while a line 120 leads to the forward end of the same two cylinders. Additional sets of cams, switches, valves, and piping would be employed to operate the pairs of cylinders for the remaining separators in the same manner.

As timer 105-110 acts to change the position of the valves of any one separator, the valves move simultaneously; for example, piston rods 38 and 57 move together. In one condition valve 35 opens while valve 54 closes and in a second condition valve 54 opens while valve 35 closes. In either event there will be a time during the period of valve movements when both valves 54 and 35 are partially open. At this time a pressure from blower 29 is applied to the top of the tube 16 while a vacuum from blower 85 is applied to the bottom of the tube.

The arrangemnt is such that on any specific separator 10, 11, 12 or 13, when the top valve is open the bottom valve is closed and vice versa. Furthermore, cams 106, 107, etc., are so arranged that the top valves, e.g., 35, 40, etc., of three of the separators are open while the top valve of only one of the separators is closed, the top valves of the separators being closed in rotation. Thus, dust-laden air from blower 29 always is entering three of the bags. The fourth bag, 16 in the drawings, is closed off from blower 29, but communicates with blower 85 so that air is being withdrawn from separator 10.

The air being introduced into separators 11, 12 and 13 is returning to the building 9 in which the collector apparatus is located, with the dust being trapped in the separators as the air flows through the walls of the bags. When the bottom gate 54 of separator 10 was opened and the air flow reversed through bag 16, the dust in the bag is drawn into housing 50 through chute 15. The majority of this dust would be in an agglomerate form and would fall in piles 125 on belt 65.

Some of the dust from separator 10, however, would be airborne. The majority of this latter dust would be extracted from the air by the perforate periphery of drum 73 as the air passed through the portion of the drum controlled by the valve means 78, 79. With no air being drawn through the remainder of the drum the dust thus deposited would be removed from the periphery of the drum by beaters 96 and brush 99. To the extent that fine dust went through the perforate periphery 73 of the drum, it would be returned through conduits 86 and 30 to one of the three separators 11, 12 or 13. Periodically the control apparatus of FIGURE 5 would open gate 35, close gate 54, and at the same time close the gate at the top of one of the other separators and simultaneously open the gate at the bottom of that one other separator.

I prefer to draw the vacuum in housing 50 by means of a separate blower 85. However, in the illustrated arrangement it is possible to draw a vacuum in housing 50 by opening damper valve 89 in conduit 88. The vacuum is thus drawn through the intake 28 of blower 29. If this were done, blower 85 could be shut down while closing damper valve 87 to prevent any reverse circulation. In either event, the amount of air passed through conduit 86 or conduit 88 need be only a very small fraction of the air employed to originally pick up the dust, i.e. that air introduced into the separators through conduit 28. Thus, for example, blower 85 has a capacity which is only a fraction of that of blower 29.

I claim:

1. A material collecting apparatus for use in a building, said apparatus including: a plurality of material collecting enclosures having a wall of air permeable and material impermeable material, said enclosures being arranged in said building so that air passing from the interior of the enclosure through the wall to the exterior is free to circulate in said building, the side of the wall directly exposed to the interior of the building being identified as the exterior and the other side of the wall being a part of the interior of the enclosure; air pickup means for the material, said means including a blower to produce a strong flow of air to pick up and carry the material and conduit means communicating directly with the interior of said enclosures to discharge the air and material borne thereby into the enclosures with the material being trapped therein and the air being returned to the building after passing through said wall, said means including intake valves operable to selectively block the flow to any one of the enclosures through the conduit means; and cleaning means communicating directly with the interior of the enclosures to remove the trapped material therefrom, said cleaning means including discharge valves operable to selectively block the flow from the enclosures through the cleaning means, said cleaning means communicating with said conduit means and being constructed to produce an air flow from the interior of an enclosure, when the discharge valve associated therewith is open, to the conduit means, said cleaning means including a material separating device located between the discharge valves and the conduit means to separate a majority of the material removed from the enclosure from the air withdrawn from the enclosure and delivered to the conduit means.

2. An apparatus as set forth in claim 1, wherein said wall is upright, said conduit means communicates with the top of said enclosures, the bottom of said enclosures benig funnel-shaped, said cleaning means communicates with the bottom of the enclosures at the bottom of the funnel, and said blower has a discharge communicating with said conduit means at a point at which the intake valves are between the discharge and the enclosures.

3. An apparatus as set forth in claim 2, wherein said cleaning means includes a second blower of substantially smaller capacity than the blower of the air pickup means, said second blower having an intake in communication with the interior of said enclosures through the discharge valves and a discharge in communication with the conduit means.

4. An apparatus as set forth in claim 1, wherein said device incluudes a rotating drum having a perforate periphery, power means connected to said drum to rotate the same, said device includes a valve means to limit the flow of air through only a part of the drum at a time with the portion of the drum exposed to said air flow constantly changing by reason of the rotation of the drum.

5. An apparatus as set forth in claim 4, wherein said discharge valves are at the lower ends of said funnel-shaped bottoms, and including a generally horizontal conveyor extending from below said valves and said bottoms to a discharge point, said drum being rotatable about an approximately horizontal axis and positioned above said conveyor.

6. An apparatus as set forth in claim 4, wherein the air flows through the drum from the outside of said periphery to the inside, and including friction means contacting another part of the outside of the drum to brush any dust or the like therefrom.

7. An apparatus as set forth in claim 6, wherein said friction means includes a rotating brush, and including vacuum cleaning means for said brush.

8. A material collecting apparatus for use in a building, said apparatus including: a plurality of primary material separators, each of said separators comprising a rigid intake plenum, a rigid discharge plenum positioned below the intake plenum and a cloth tube connecting the two plenums and forming a passageway between the interior of the two plenums, each discharge plenum forming an individual discharge chute, said separators being positioned so that the exterior of the tubes are in fluid communication with the interior of said building; a discharge valve in each of said chutes to control the flow of air and material therethrough; a blower having an intake to receive air and air-borne material and a discharge; conduit means capable of a normal flow of a given amount when used with said blower connected to said discharge and having a duct communicating individually with the interior of each intake plenum; an intake valve in each of said ducts to control the flow of air and material therethrough; a common housing about the lower ends of said chutes and having a discharge opening therein; conveyor means for the agglomerated material and extending from said chutes to the discharge opening; power means connected to said valves to operate the same in a sequence such that the two valves associated with a single separator are opened and closed alternately with respect to each other and that the valves of one enclosure are out of phase with the valves of another enclosure; and an air duct means from said housing to said conduit means for air-borne material, said air duct means having a normal flow of substantially less than said given amount.

9. An apparatus as set forth in claim 8, wherein said air duct means has a discharge end connected to the blower intake.

10. An apparatus as set forth in claim 8, wherein said air duct means includes a second, comparatively low volume, blower having an intake and a discharge with its discharge connected to said conduit means and its intake connected to said housing.

11. The method of separating material from an initial stream of air with airborne material and using a plurality of material catching bags without significant air loss from the building housing the bags, including the steps of: directing said stream into one of said bags to catch and agglomerate a majority of the material in said bag; returning the air which passes through said one bag to the building; subsequently directing said stream into a second of the bags to thereby catch and agglomerate a majority of the material in said second bag; returning the air which passes through the second bag to the building; while said stream is being directed into the second bag, emptying said one bag by gravity assisted by a suction which produces a second stream of air inwardly through said one bag from the interior of said building, with said second stream being smaller in volume than said first stream; separating the agglomerated material from said second stream; introducing said second stream to said first stream; and thereafter reversing the two bags with respect to the performance of the last four steps.

12. A material collecting apparatus for use in a building, said apparatus including: a plurality of primary material saparators, each of said separators comprising a rigid intake plenum, a rigid discharge plenum positioned below the intake plenum and a cloth tube extending vertically and connecting the two plenums and forming a vertical passageway between the interior of the two plenums, each discharge plenum forming an individual discharge chute, said separators being positioned so that the exterior of the tubes are in fluid communication with the interior of said building; a discharge valve in each of said chutes to control the flow of air and material therethrough; a blower having an intake to receive air and material and a discharge; conduit means connected to said discharge and having a duct communicating individually with the interior of each intake plenum; an intake valve in each of said ducts to control the flow of air and material therethrough; a common housing about the lower end of said chutes to receive air and material from a tube when the respective discharge valve is open; means connected to said housing to apply a vacuum thereto; and power means connected to said valves to normally position the valves of the separators in a first condition such that the intake valves of a majority of the separators are open with the discharge valves of those separators being closed to cause those separators to act as material separators, to position the valves of at least one separator in a second condition such that the discharge valve is open and the intake valve is closed, and to sequentially change the valves of the separators from the first condition to the second condition and then from the second condition to the first condition with, during the movement from the first condition to the second condition, the intake valve of a separator moving from the open to the closed positions simultaneously with the discharge valve of that separator moving from the closed to the open position, whereby during the movement there will be a time when both valves of the separator are partially open and air pressure will be applied to the top interior of the tube and simultaneously a vacuum wil be applied to the bottom of the tube.

References Cited

UNITED STATES PATENTS

| | | | |
|---|---|---|---|
| 513,123 | 1/1894 | Marmon | 55—341 X |
| 1,349,480 | 8/1920 | Wilsmore | 55—236 |
| 1,784,339 | 12/1930 | Clasen et al. | 55—287 X |
| 1,849,649 | 3/1933 | Wallace | 55—430 X |
| 2,125,574 | 8/1938 | Knight et al. | 55—432 X |
| 2,473,501 | 6/1949 | Bahnson | 55—290 X |
| 2,534,600 | 12/1950 | Hutchings | 55—291 X |
| 3,097,936 | 7/1963 | Lincoln | 55—283 X |
| 3,224,172 | 12/1965 | Eiben | 55—303 |

HARRY B. THORNTON, *Primary Examiner.*

S. W. SOKOLOFF, *Assistant Examiner.*